United States Patent [19]
Lehman et al.

[11] Patent Number: 5,782,071
[45] Date of Patent: Jul. 21, 1998

[54] DISC MOWER PIVOT SEALING APPARATUS

[75] Inventors: Barry E. Lehman, York; Kenneth W. McLean, New Holland, both of Pa.

[73] Assignee: New Holland North America, Inc., New Holland, Pa.

[21] Appl. No.: 681,242

[22] Filed: Jul. 22, 1996

[51] Int. Cl.[6] ................................................ A01D 34/66
[52] U.S. Cl. ....................................... 56/6; 56/15.2
[58] Field of Search ......................... 56/DIG. 1, 13.6, 56/208, 192, 6, 14.4, 14.7, 16.4 R, 228, DIG. 6; 460/20, 116, 119

[56] References Cited

U.S. PATENT DOCUMENTS

| | | | |
|---|---|---|---|
| 3,875,728 | 4/1975 | Bacon | 56/17.5 |
| 4,478,027 | 10/1984 | De Coene et al. | 56/16.4 R |
| 4,860,526 | 8/1989 | Hottes | 56/6 X |
| 4,974,399 | 12/1990 | Haberkorn | 56/6 |
| 5,423,165 | 6/1995 | Walch et al. | 56/6 |

*Primary Examiner*—Michael J. Carone
*Assistant Examiner*—Robert Pezzuto
*Attorney, Agent, or Firm*—Larry W. Miller; J. William Stader; F. A. Seemar

[57] ABSTRACT

A sealing apparatus is provided for a pivot assembly on a disc mower incorporating a disc cutterbar to sever standing crop material by impact action. A first circular labyrinth seal has a T-shaped cross-section and fills a correspondingly-shaped groove between the pivot support arm and the gearbox housing. The combination of the T-shaped groove and corresponding labyrinth seal creates a labyrinth path for the entrance of dirt into the pivot assembly. A second circular face seal is constructed with a deformed inner diameter to create a lip that engages the face of the gearbox hubs. The deformed inner diameter lip of the face seal creates an inner cavity underneath the seal that can be filled with grease to provide a further deterrent to the entry of dirt into the pivot mechanism.

13 Claims, 14 Drawing Sheets

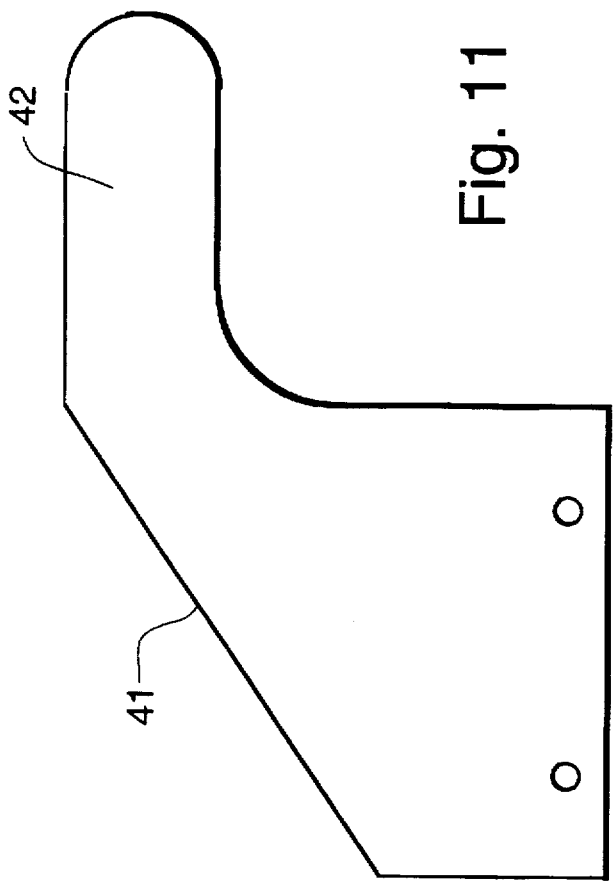
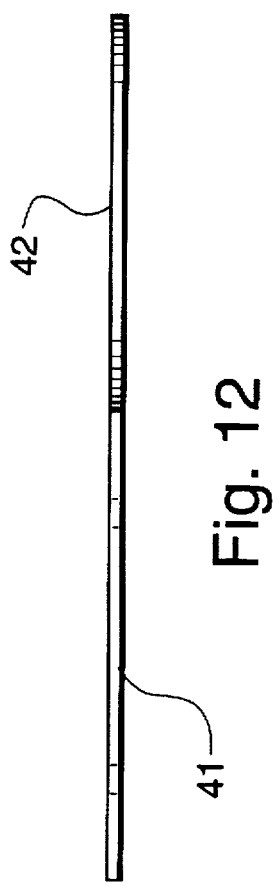
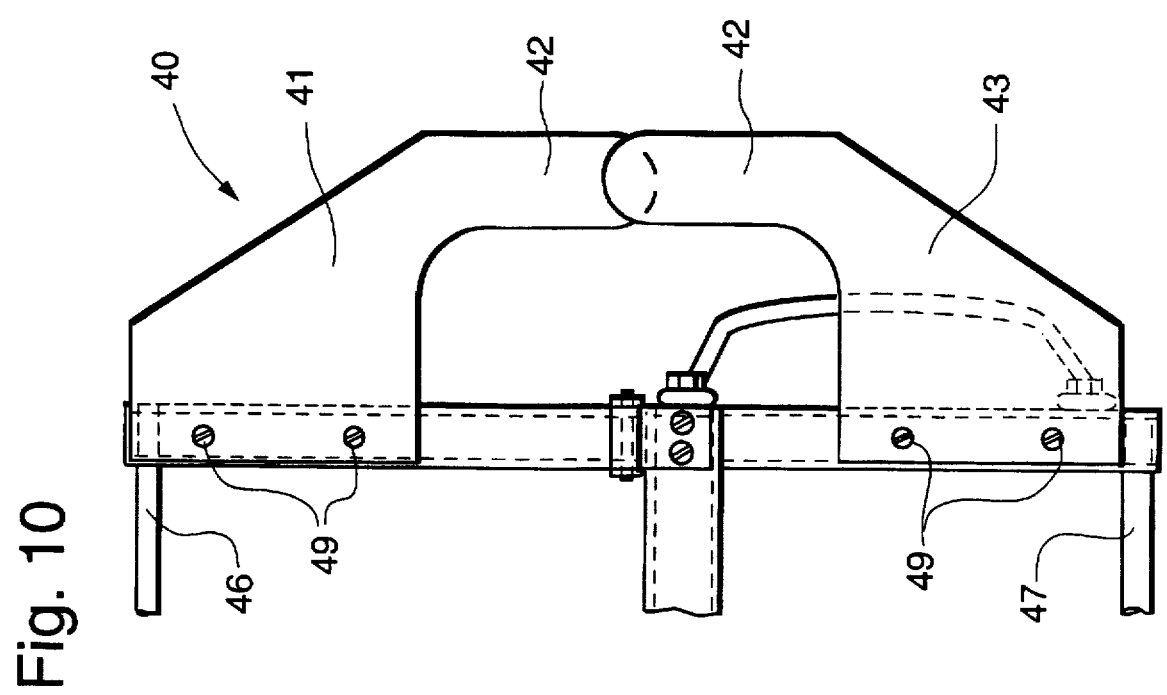

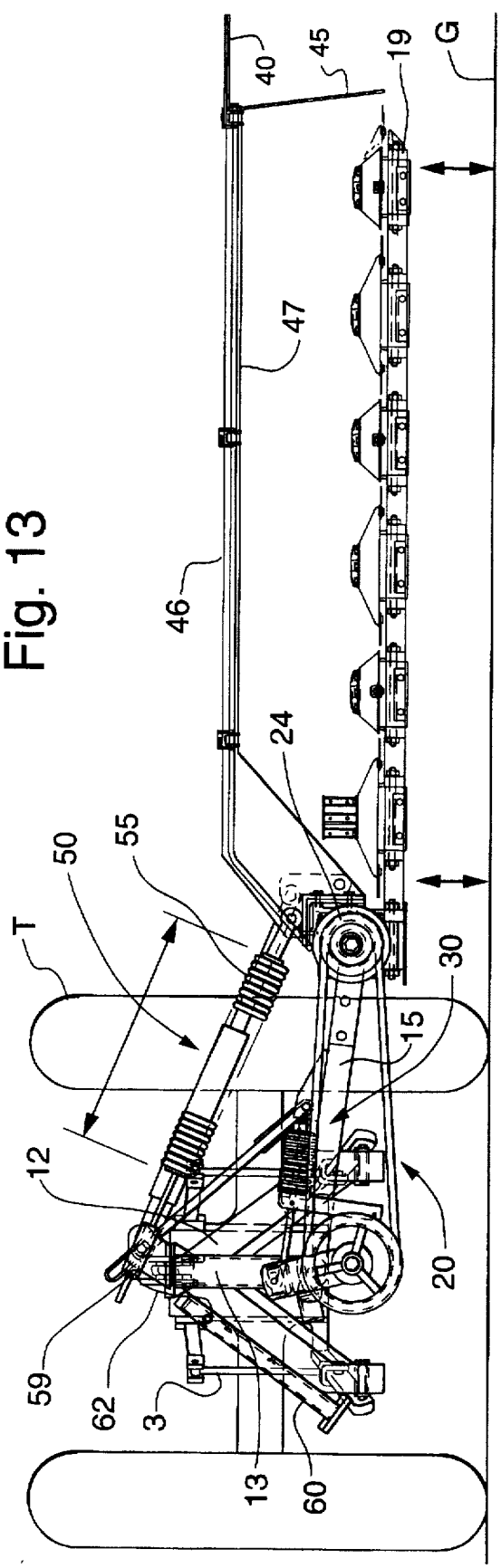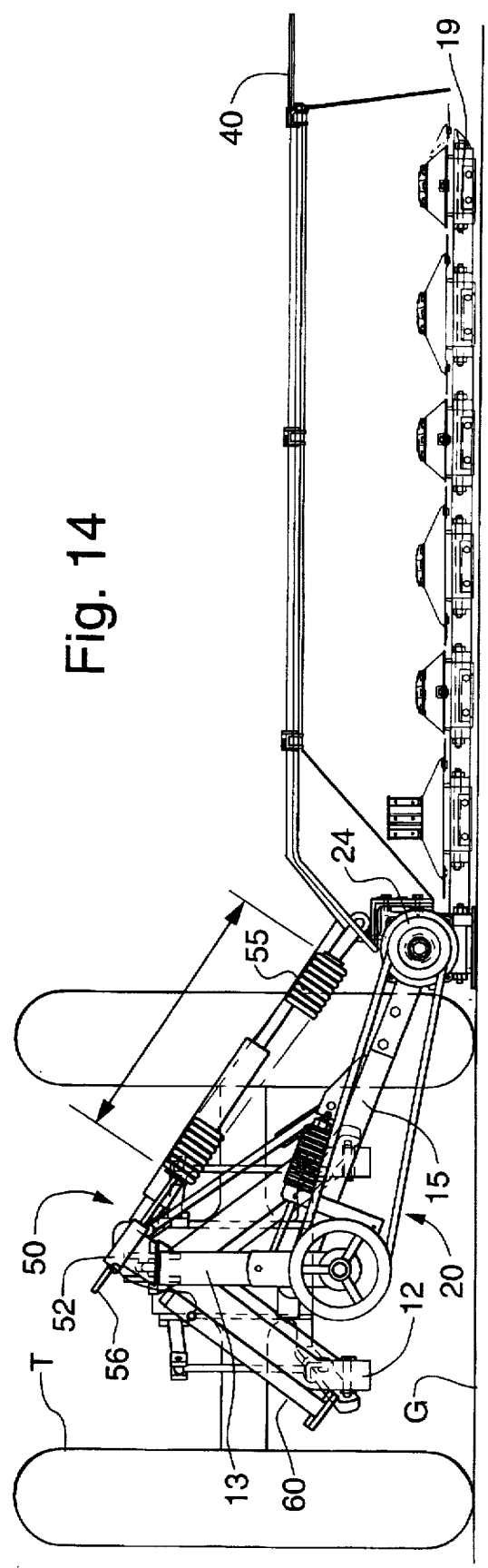

5,782,071

1
DISC MOWER PIVOT SEALING APPARATUS

BACKGROUND OF THE INVENTION

This invention relates generally to a mower mounted to the three-point hitch of a tractor and carrying a disc cutterbar that severs standing crop material by impact action and, more particularly, to a sealing apparatus for the pivot assembly about which the disc cutterbar pivots to move between the raised transport position and the lowered operative position.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262, issued to E. E. Koch and F. F. Voler, the descriptive portions thereof being incorporated herein by reference.

The construction of disc cutterbars has evolved over the years to the configuration of having a modular construction with cutter modules and spacer modules, such as shown in U.S. Pat. No. 4,840,019, issued to L. J. Pingry, the descriptive portions of which are incorporated herein by reference. In some instances, the cutter modules and the spacer modules were integrally formed into one unit such as shown and described in U.S. Pat. No. 4,947,629, issued to R. Ermacora and H. Neuerburg.

A disc mower is typically mounted to the three-point hitch of the tractor providing the source of operative power thereto. The driven components of the disc cutterbar are operatively connected through a conventional drive mechanism to the power-takeoff shaft of the tractor or, possibly to a hydraulic drive mechanism powered from the tractor. The disc mower is provided with a base frame that may be supported from the tractor three-point hitch. The disc cutterbar is pivotally supported from the base frame to be movable between a raised transport position, in which the cutterbar may be generally vertically oriented, and a lowered operative position in which the cutterbar is riding on the ground to sever standing crop material through operation of the rotating disc members and affixed cutting knives.

The mower structure carries a pivot mechanism defining a longitudinally extending pivot axis to enable the cutterbar to move between a generally vertical, raised transport position and a generally horizontal, lowered operative position adjacent the ground so that the cutterbar can be operated substantially parallel thereto. The operation of the cutterbar close to the ground typically result in the rotating knives occasionally impacting the surface of the ground to throw soil around the mower structure, including the pivot mechanism. With time, the accumulation of dirt enters the bushing working surfaces causing extraordinary wear due to the abrasive nature of the soil and resulting in a premature failure of the bushings and the pivot mechanism. Worn bushings allow excessive fore-and-aft movement of the cutterbar, resulting in misalignment of the drive mechanism.

SUMMARY OF THE INVENTION

It is an object of this invention to provide a sealing apparatus for a disc mower pivot mechanism to overcome the aforementioned disadvantages of the prior art.

It is another object of this invention to provide a seal for the thrust washer working surfaces that conforms to the configuration of a groove between the pivot support arm and the gearbox housing.

It is a feature of this invention that the seal is formed with a T-shaped cross-section to conform to the groove between the pivot support arm and the gearbox housing.

It is an advantage of this invention that dirt is prevented from working into the groove between the pivot support arm and the gearbox housing to reach the thrust washer working surfaces.

It is another feature of this invention that the seal is formed in a circular shape to fit around the pivot mechanism.

It is another advantage of this invention that the pivot mechanism has an extended operative life.

It is still another object of this invention to provide a sleeve bushing seal to prevent dirt from entering the radial bearing surface between the bevel gearbox front and rear hubs and the front and rear pivot support arms.

It is still another feature of this invention that the sleeve bushing seal is formed with a deformed inner diameter to make contact with the face of the gearbox hubs.

It is still another advantage of this invention that the deformed inner diameter lip creates an inner cavity underneath the seal.

It is yet another feature of this invention that the inner cavity can be filled with grease to further form a barrier to the entrance of dirt into the bushing.

It is yet another object of this invention to provide grease fittings to permit a replenishment of the supply of grease to the sealing mechanism.

It is a further object of this invention to provide a sealing mechanism for the pivot assembly of a disc mower which is durable in construction, inexpensive of manufacture, carefree of maintenance, facile in assemblage, and simple and effective in use.

These and other objects, features and advantages are accomplished according to the instant invention by providing a sealing apparatus for a pivot assembly on a disc mower incorporating a disc cutterbar to sever standing crop material by impact action. A first circular labyrinth seal has a T-shaped cross-section and fills a correspondingly-shaped groove between the pivot support arm and the gearbox housing. The combination of the T-shaped groove and corresponding labyrinth seal creates a labyrinth path for the entrance of dirt into the pivot assembly. A second circular face seal is constructed with a deformed inner diameter to create a lip that engages the face of the gearbox hubs. The deformed inner diameter lip of the face seal creates an inner cavity underneath the seal that can be filled with grease to provide a further deterrent to the entry of dirt into the pivot mechanism.

BRIEF DESCRIPTION OF THE DRAWINGS

The advantages of this invention will be apparent upon consideration of the following detailed disclosure of the invention, especially when taken in conjunction with the accompanying drawings wherein:

FIG. 10 is an enlarged top plan view of the distal end of the mower to depict the mounting of the cutterbar guard on the canopy support;

FIG. 11 is an enlarged top plan view of one half of the cutterbar guard;

FIG. 12 is an elevational view of the cutterbar guard shown in FIG. 11;

FIG. 13 is a rear elevational view of the disc mower shown in FIG. 1 with the disc cutterbar raised to the maximum upward flotational movement;

FIG. 14 is a rear elevational view similar to that of FIG. 13, but with the disc cutterbar lowered to the ground, which is the maximum downward flotational movement of the cutterbar;

DETAILED DESCRIPTION OF THE PREFERRED EMBODIMENT

Figure 1:
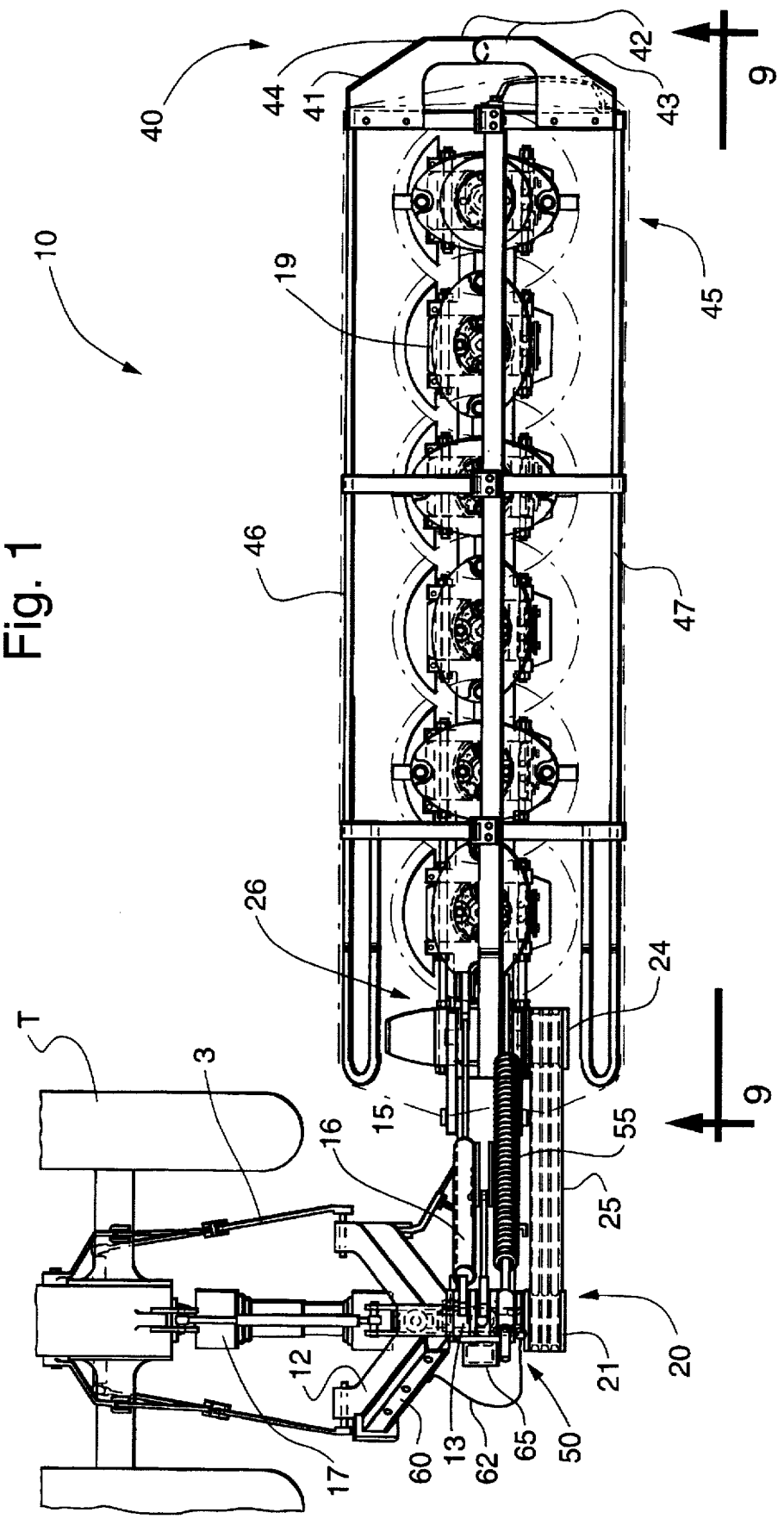
FIG. 1 is a top plan view of a disc mower incorporating the principles of the instant invention, the mower is mounted to the three-point hitch of a representative tractor, the mower canopy being broken away for purposes of clarity.
Figure 2:
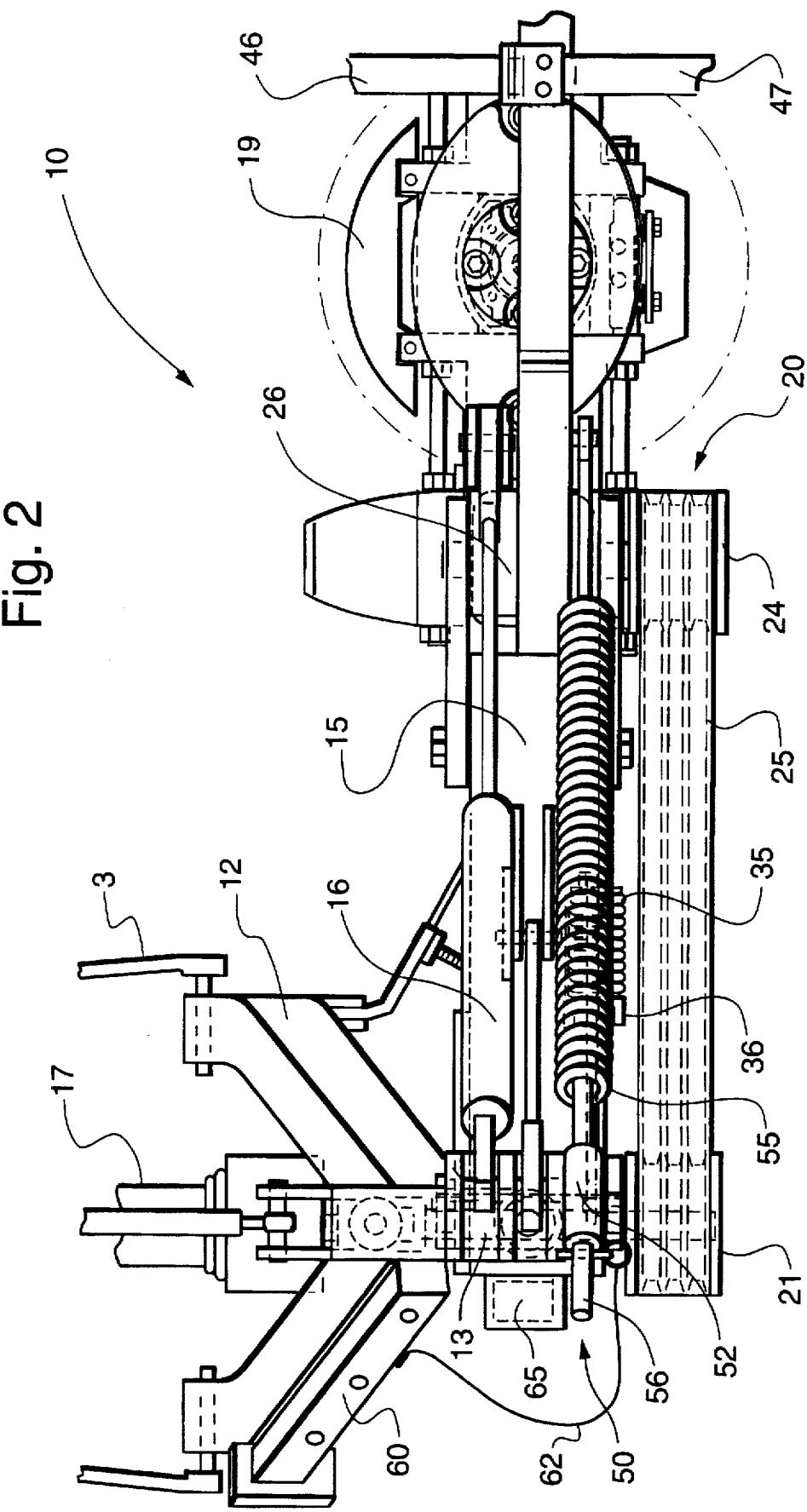
FIG. 2 is an enlarged partial top plan view of the mower shown in FIG. 1 to depict the drive mechanism.
Figure 3:
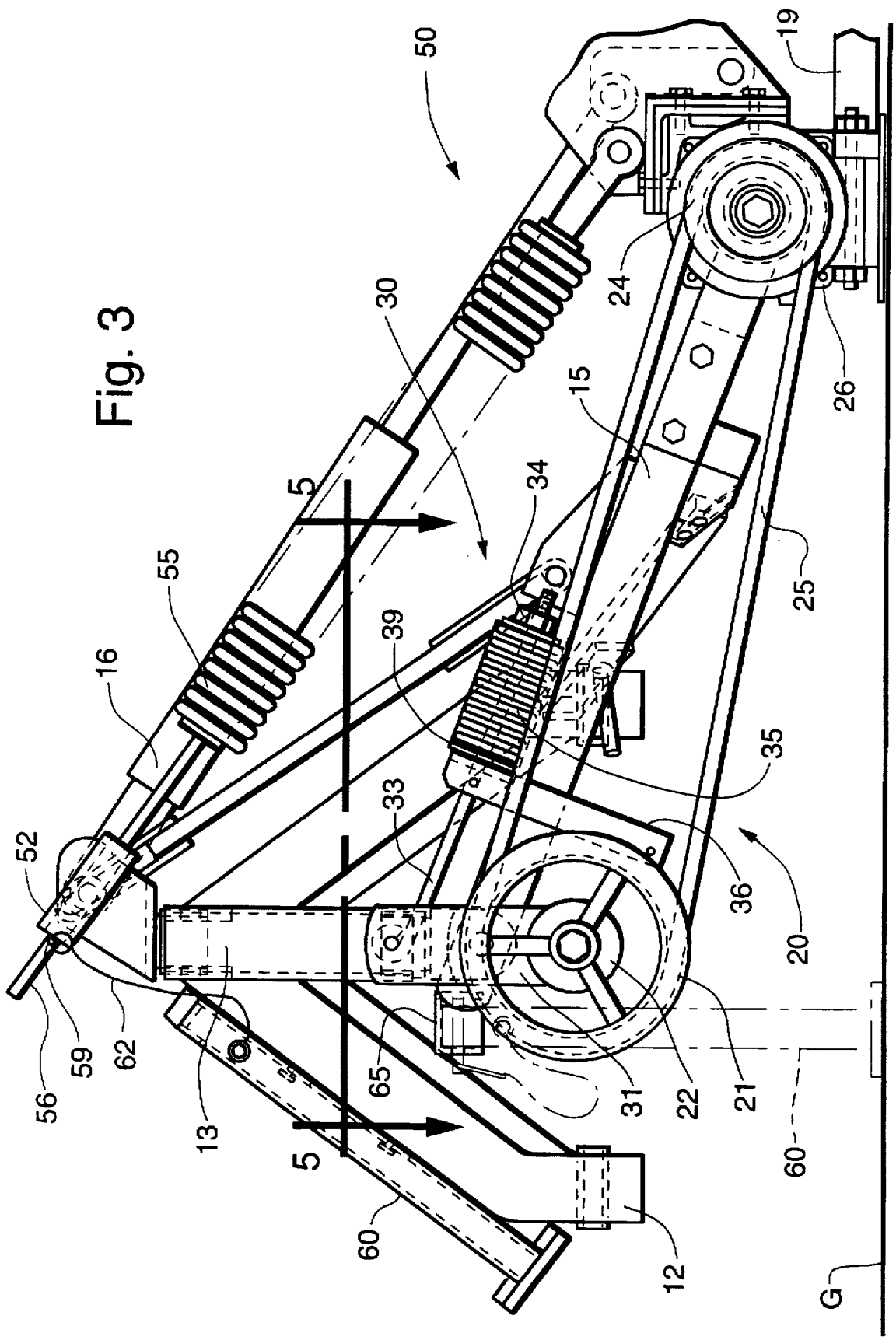
FIG. 3 is a partial elevational view of the disc mower as seen in FIG. 2, the support position of the jack stand being shown in phantom.
Figure 4:
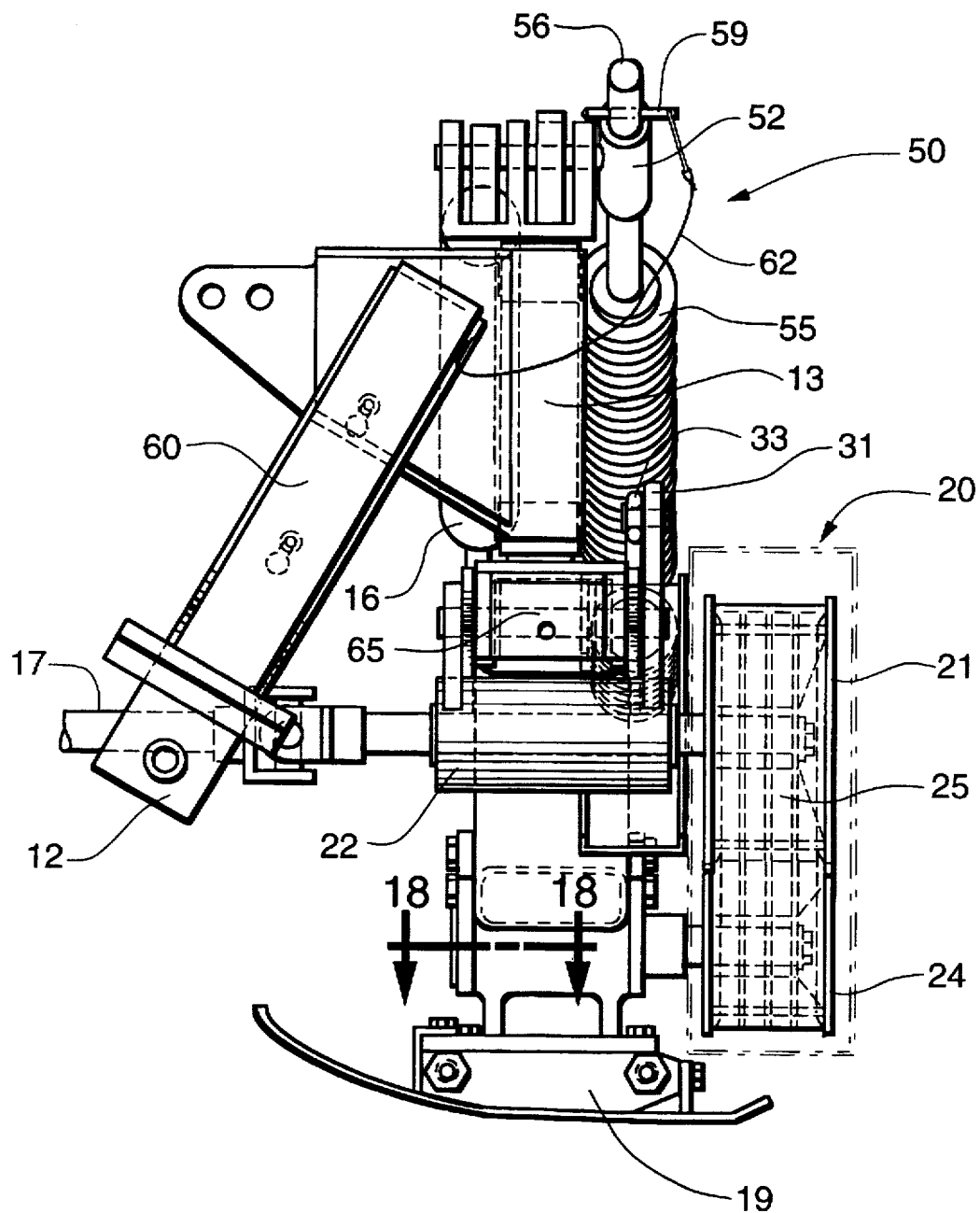
FIG. 4 is a left end view of the disc mower as shown in FIG. 3, the shielding surrounding the V-belt drive apparatus being shown in phantom.
Figure 5:
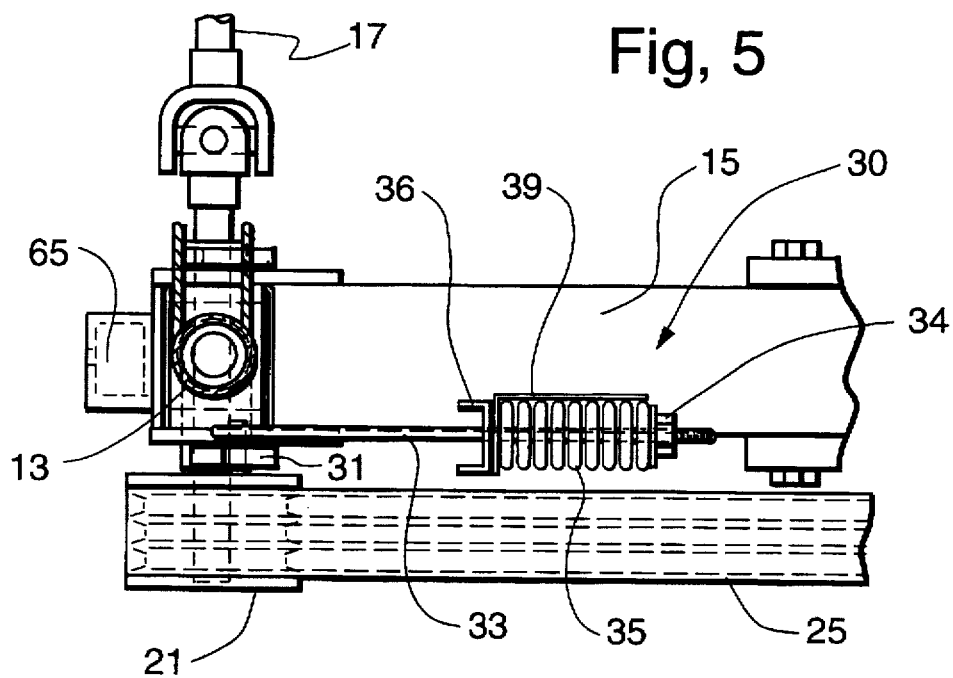
FIG. 5 is a partial cross-sectional view of the disc mower corresponding to lines 5—5 of FIG. 3 to depict a top plan view of the spring tensioning mechanism for the V-belt drive apparatus.
Figure 6:
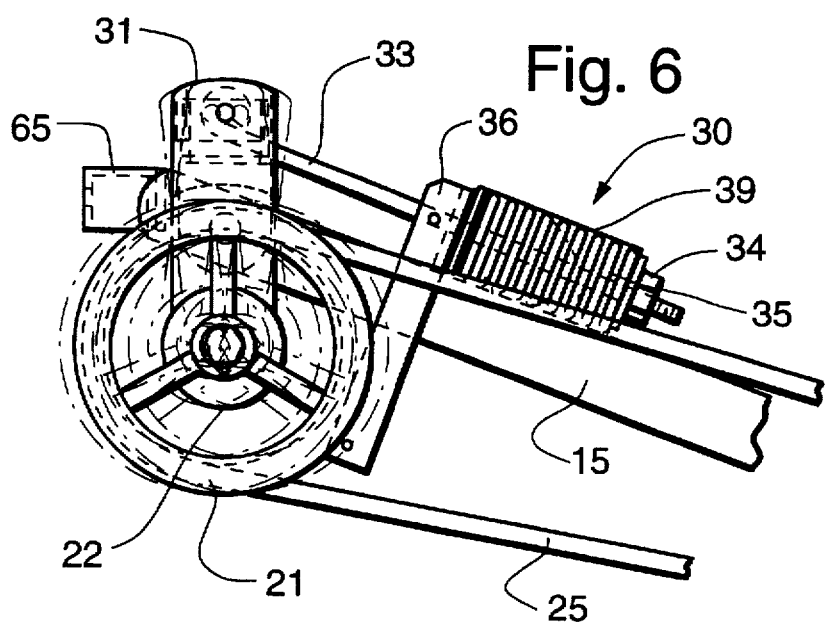
FIG. 6 is a rear elevational view of the spring tensioning mechanism shown in FIG. 5.
Figure 7:
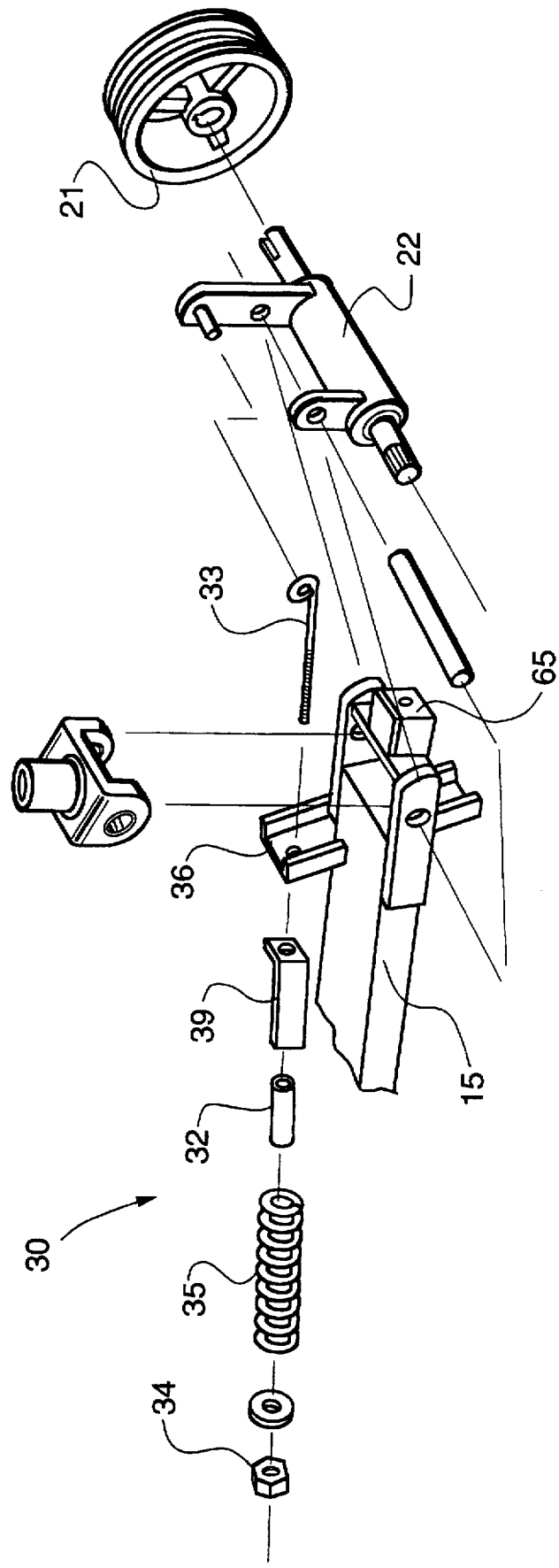
FIG. 7 is an exploded view of the spring tensioning mechanism.

Referring now to the drawings and, particularly, to FIGS. 1 and 2, the disc mower 10 utilizing a modular disc cutterbar and incorporating the principles of the instant invention can best be seen. Left and right references are used as a matter of convenience and are determined by standing at the rear of the machine facing forwardly into the normal direction of travel.

The disc mower 10 is mounted in a conventional manner to the three-point hitch 3 of a tractor T to be operable outboard to the right of the tractor T. The mower 10 includes a triangular mounting frame member 12 adapted to connect to the three-point hitch mechanism 3 and an integral base frame 13 to support the cutterbar 19 and the drive mechanism 20. The mower also includes a support frame 15 pivotally connected to the base frame 13, as will be described in greater detail below, for supporting the disc cutterbar 19 for pivotal movement between a raised transport position and a lowered, ground-engaging, operative position. The support frame 15 also supports a protective canopy 45 encircling the disc cutterbar 19.

The V-belt drive mechanism 20 is operably powered from a power-takeoff (PTO) shaft 17 transferring rotational power from the tractor T in a conventional manner. A drive pulley 21 is supported in a cantilevered fashion from a main bearing 22 and is powered directly from the PTO shaft 17. A driven pulley 24 transfers rotational power into a gearbox 26, which in turn provides operative driving power for the disc cutterbar 19, as is described in co-pending U.S. patent application Ser. No. 08/673,604, entitled "Disc Cutterbar for Agricultural Implements" and filed concurrently herewith, the descriptive portions of which are incorporated herein by reference. An endless V-belt 25 entrains the drive pulley 21 and the driven pulley 24 to transfer rotational power therebetween.

The V-belt 25 must be properly tensioned to maximize life of the belt 25 and the associated supporting structure, such as the bearing 22 and gearbox 26. To provide proper tension, a spring tensioning mechanism 30 is operably connected to the drive pulley 21 to vary the distance relative to the driven pulley 24. The tensioning mechanism 30 includes a pivot member 31 pivotally connected to the base frame 13 for support of the drive pulley 21 at one end thereof. The opposing end of the pivot member 31 is connected to a tensioning rod 33 to effect pivotal movement of the pivot member 31 and a corresponding movement of the drive pulley 21.

The tensioning rod 33 is spring-loaded by a spring 35, properly positioned on the tensioning rod 33 by a spacer 32, to urge the drive pulley 21 away from the driven pulley 24 and, thereby, apply tension in the V-belt 25. The spring 35 pushes against a support bracket 36 affixed to the base frame 13. An adjustment nut 34 threaded onto the tensioning rod 33 is effective to compress the spring 35 against the support bracket 36 and, thereby, draw the tensioning rod 33 to apply greater tension to the belt 25. An L-shaped bracket 39 is affixed to the support bracket 36 and extends along the spring 35 to terminate at a location corresponding to the correct spring length for applying the proper tension on the belt 35.

In operation, the tension is varied in the V-belt 25 by manipulating the adjustment nut 34 on the tensioning rod 33 and, thereby, effect a pivotal movement of the pivot member 31. The operator can determine the proper tension to be applied to the belt 25 by compressing the spring 35 until the length of the spring 35 equals the length of the indicator bracket 39 positioned adjacent the spring 35. The spring 35 is designed to maintain the adequate tension in the V-belt 25 during the initial stretch of the V-belt 25 so that the operator will not be inconvenienced by having to tighten the V-belt 25 during the initial use period. Tension can be adjusted at normal service intervals.

Referring now to FIGS. 1 and 8–12, the details of the cutterbar guard 40 can best be seen. The guard 40 is mounted on the distal end of the canopy support 46, 47 from which the canopy 45 is hung to prevent objects from coming laterally into the remote end of the disc cutterbar 19. This guard 40 consists of a pair of sheet metal stampings 41, 43. One of the stampings 41 is bolted to the outboard end of the front canopy support 46, which is mounted to swing rearwardly to expose the cutterbar 19 for access thereto, while the other identical stamping 43 is bolted to the outboard end of the rear stationary rear canopy support 47.

The two guard pieces 41, 43 are formed with an "L-shape" and are installed such that the legs 42 of the L-shape overlap at the middle of the support frame 15 to form a continuous guard 40. The continuous configuration does not present a gap to catch viney crops, saplings, fence wire, etc. that can result in a deformation of or damage to the canopy support.

Figure 8:
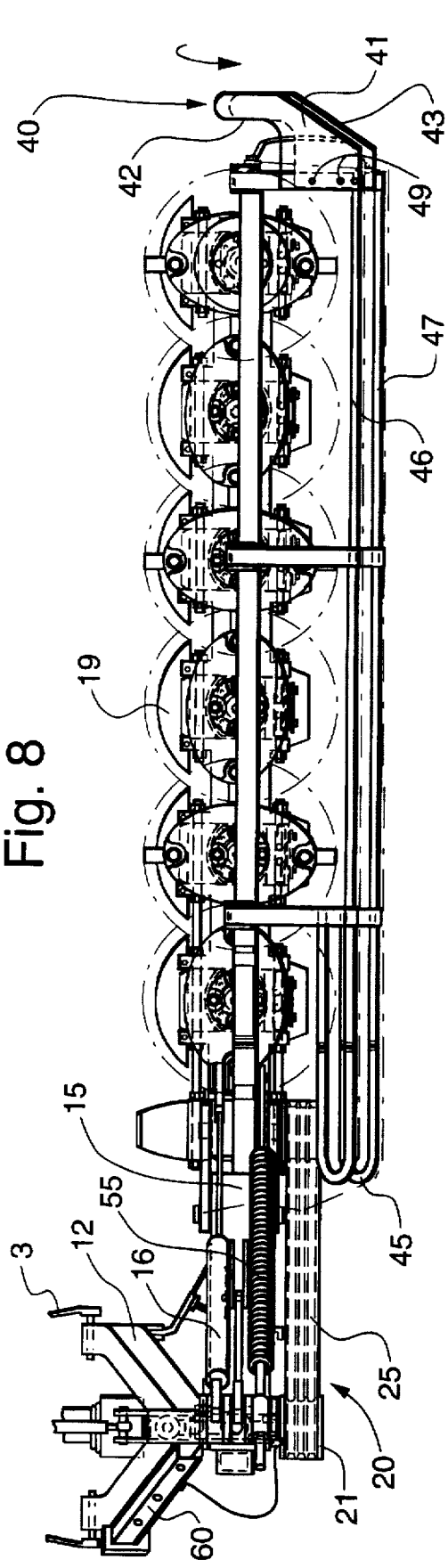
FIG. 8 is a top plan view of the disc mower similar to that of FIG. 1 but with the front part of the mower canopy folded back to permit access to the disc cutterbar.
Figure 9:
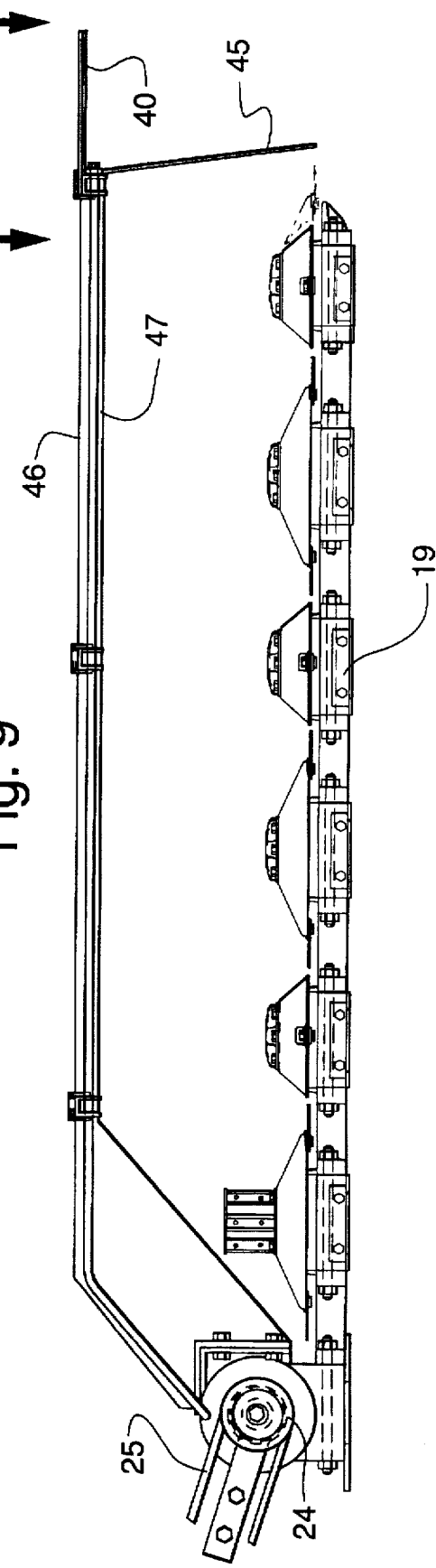
FIG. 9 is an enlarged rear elevational view of the disc mower corresponding to lines 9—9 of FIG. 1 to depict the disc cutterbar and canopy.

As best seen in FIGS. 8 and 10, the leg 42 of the front guard stamping 41 is positioned below the leg 42 of the rear guard stamping 43 so that when the front canopy support 46 is raised, the leg 42 of the front guard 41 pivots down and toward the front of the rear guard member 43. The front guard member 41 extends toward the front of the front canopy support 46 and beyond the front edge thereof where the canopy 45 is beveled inwardly. The leading edge 44 of the guard members 41, 43 act as a guide to deflect tall crops, saplings and fence wire, etc. away from the canopy support 46, 47 and the canopy 45 so that the canopy 45 and canopy support 46, 47 are not subjected to wear from the contact therewith. The front of the guard 40 is secured directly to the canopy support 46, 47 by fasteners 49 so that no gaps exist that could catch vines, etc. and pull the canopy 45 and support frame 15 rearwardly, with possible failure thereof.

As an alternative, the guards 41, 43 could be constructed from a pliable material which will allow some deformation upon impact by a substantial object, such as a sapling, and a subsequent return to its normal shape after engagement with the object has been eliminated.

Referring now to FIGS. 1–4 and 13–17, the details of the flotation mechanism can best bee seen. The flotation mechanism 50 suspends the support frame 15 from the base frame 13 and assists the pivotal movement thereof relative to the base frame 13. In the event the cutterbar 19 strikes an object on the ground G or follows ground undulations, the cutterbar 19 can move upwardly through a range of flotational movement, as shown in a comparison between the positions of FIGS. 13 and 14. The flotation mechanism 50 includes a flotation spring 55 interconnecting the gearbox 26, or some other remote part of the support frame 15, and the base frame 13. Preferably, the spring 55 is coupled to a rod 56 that passes through a collar 52 affixed to the base frame 13.

An engagement pin 59 is engageable through a hole in the rod 56 to restrain the movement of the rod 56 through the collar 52 toward the cutterbar 19, although the rod 56 is free to pass through the collar 52 in the opposite direction. When engaged with the rod 56, the pin 59 forces an extension of the spring 55 to floatingly support the cutterbar 19 relative to the ground G. The cutterbar 19 is pivotally movable through operation of the hydraulic lift cylinder 16 interconnecting the base frame 13 and the support frame 15 to raise the cutterbar 19 into a substantially vertical orientation (not shown) for transport by pivoting the cutterbar 19 primarily about the axis corresponding to the shaft of the driven pulley 24 and partly about the pivotal connection between the base frame 13 and the support frame 15.

Figure 15:
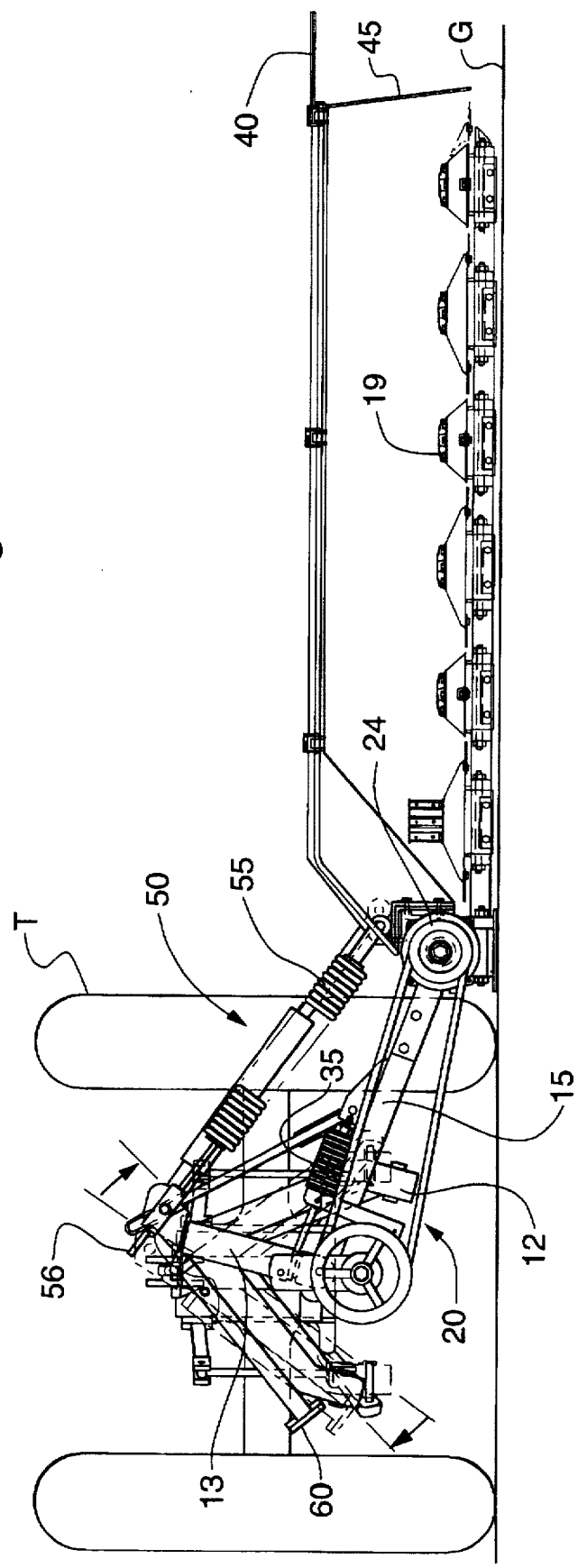
FIG. 15 is a rear elevational view of the disc mower shown in FIG. 14, the rotational movement of the mounting frame encountered by a failure to release the flotation spring force being shown in phantom.
Figure 16:
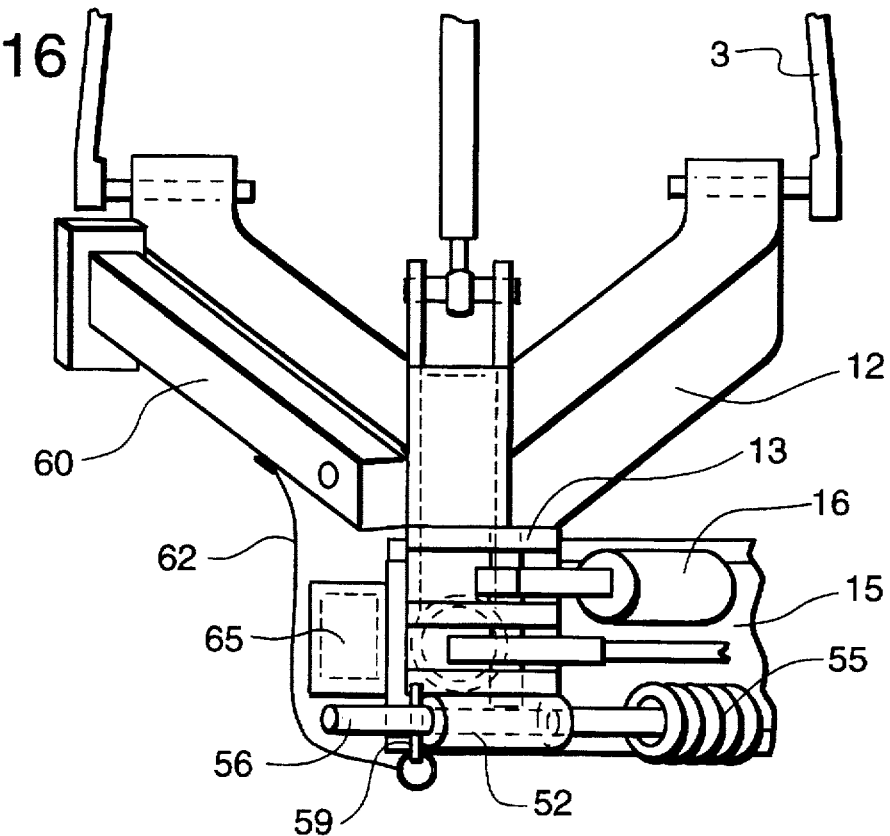
FIG. 16 is an enlarged partial top plan view of the mounting frame area of the disc mower to better show the anchor point for the flotation spring.
Figure 17:
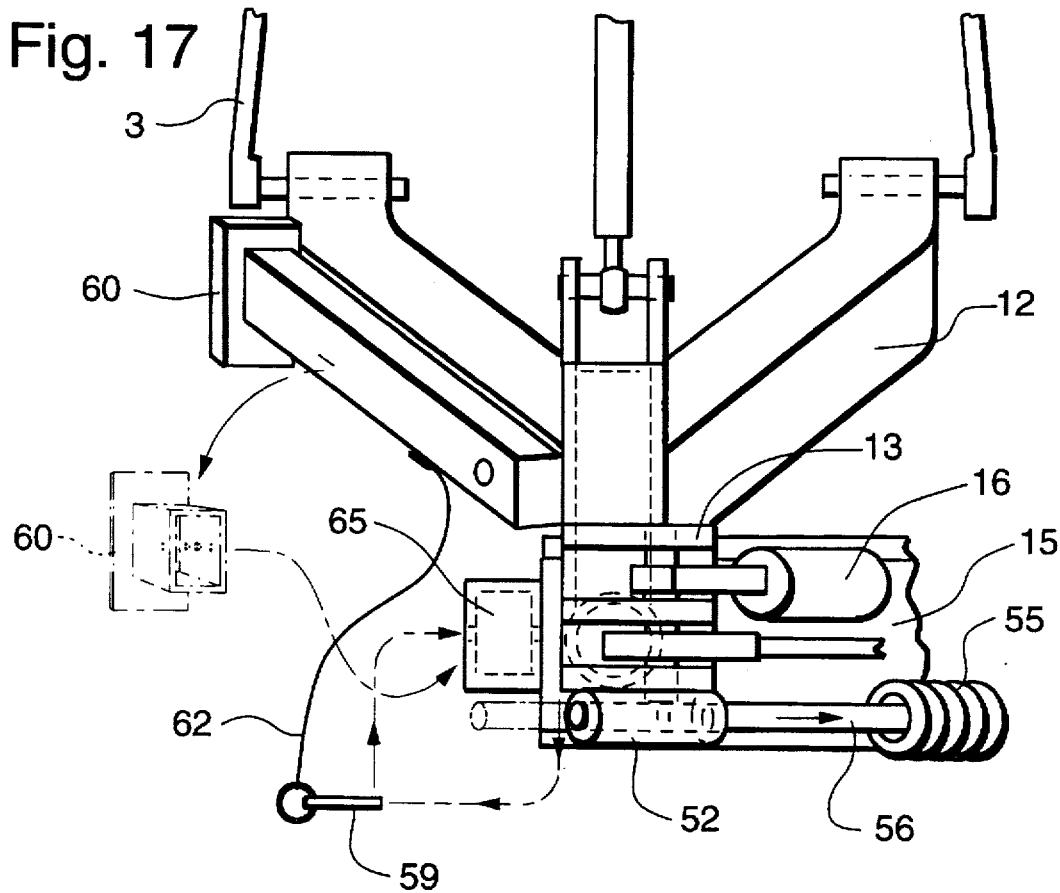
FIG. 17 is a top plan view similar to that of FIG. 16, but with the flotation spring released by the removal of the mounting pin to depict the subsequent mounting of the support jack in order to dis-mount the disc mower from the tractor three-point hitch.
Figure 18:
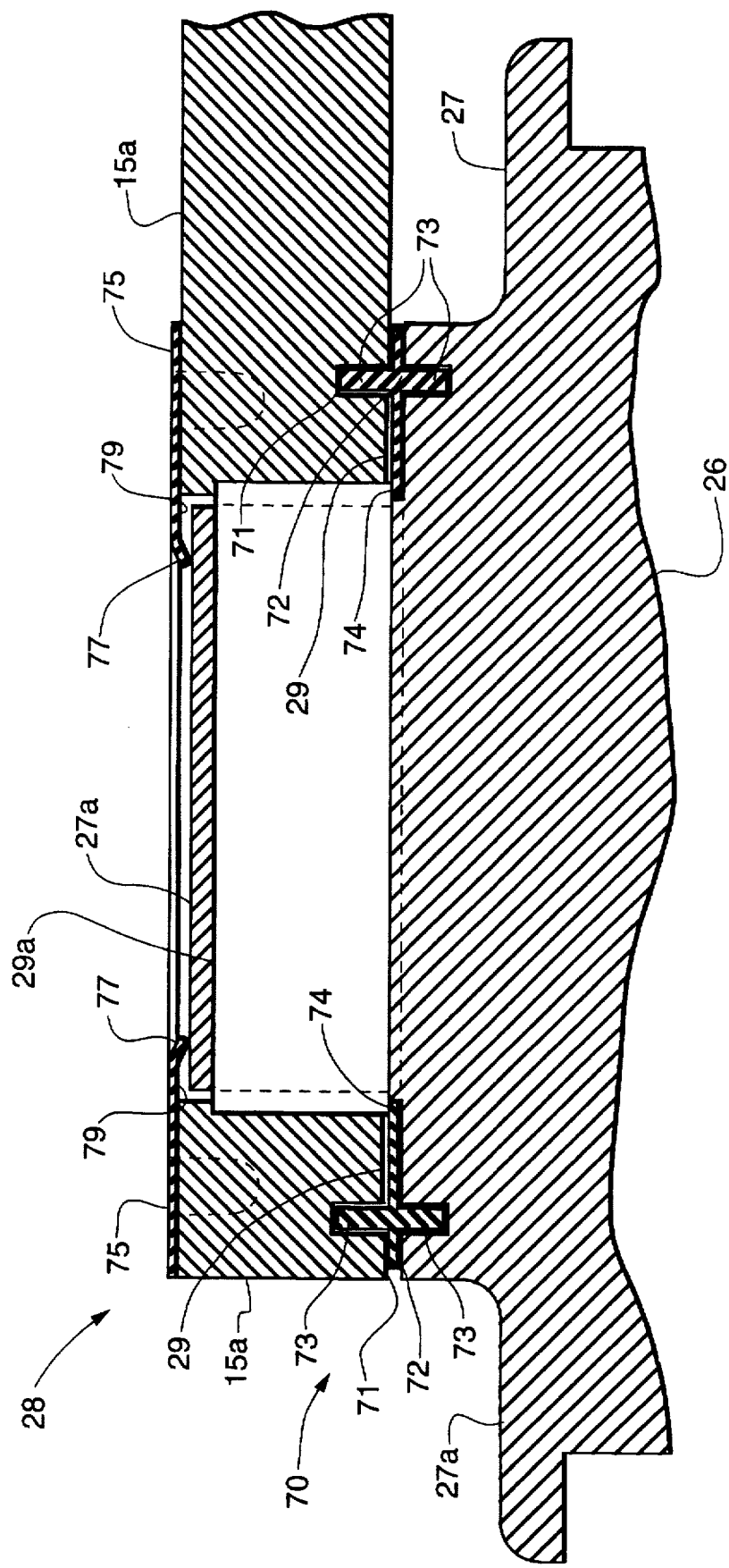
FIG. 18 is a partial cross-sectional view of the pivot mechanism taken along lines 18—18 of FIG. 4.

The disc mower 10 is stored with the cutterbar 19 lying against the ground in the operative position, as shown in FIG. 15, with the base frame 13 support on a support jack 60. As depicted in FIG. 15, the weight of the cutterbar 19 is such that the disconnection of the mounting frame 12 from the tractor three-point hitch 3 will result in a sudden rotation of the mounting frame 12, as depicted in phantom in FIG. 15, due to the force exerted by the flotation spring 55. To prevent this sudden movement of the mounting frame 12, the flotation spring 55 must be released prior to the disconnection of the mounting frame 12 from the three-point hitch 3.

To assure that the flotation spring 55 is released prior to disconnecting the mounting frame 12, the jack 60 is tethered to the engagement pin 59 by a cable 62 that is too short to allow the jack 60 to be connected to the base frame 13 in the operative position unless the engagement pin 59 is first removed from the rod 56. Once the pin 59 is removed, the jack 60 can be dismounted from the transport position on the mounting frame 12 and mounted on the mounting bracket 65 on the base frame 13 in the operative position to support the mower 10 above the ground G. The engagement pin 59 then serves its double duty by securing the jack 60 to the base frame 13. Since the engagement pin 59 has been removed from the rod 56, the rod 56 is free to slide through the collar 52 in either direction without engaging the force of the flotation spring 55.

To dismount the mower 10 from the tractor T, the operator must first raise the cutterbar 19 toward the vertical transport position to release the pressure on the flotation spring 55 and, thereby, preferably move the rod 56 upwardly through the collar 52, whereupon the pin 59 can be easily removed. Preferably, the rod 56 is provided with a detent mechanism (not shown) that will keep the pin 59 properly located in the rod 56 unless sufficient force is exerted to overcome the detent force. The detent mechanism will keep the pin 59 engaged with the rod 56 even when the cutterbar is raised to the substantially vertical transport position. The pin 59 is then removed from the rod 56 to release the flotation mechanism 50. The support jack 60 is then removed from its storage location on the mounting frame 12 and installed on the mounting bracket 65 on the base frame 13. The pin 59 is then installed to fasten the jack 60 to the mounting bracket 65.

Since the flotation spring force is released, the cutterbar 19 is then lowered to the ground G with no flotation support from the spring 55, the rod 56 sliding through the collar 52. The mower 10 is then resting on the jack 60 and the lowered cutterbar 19. The mounting frame 12 can then be released from the three-point hitch 3 and the mower 10 removed from the tractor T. Re-mounting the mower 10 to the tractor T is accomplished by reversing the above procedure.

The sealing apparatus 70 for the pivot mechanism 28 pivotally supporting the disc cutterbar 19 from the support frame 15 is best seen in FIGS. 18–23. The pivot mechanism 28 includes a thrust washer 29 providing a bearing surface between the gearbox housing 27 on the pivot support arms 15a forming part of the support frame 15. The thrust washer 29 withstands the fore-and-aft loads imposed on the cutterbar 19. Beyond the thrust washer 29 is a bushing 29a, or alternatively a bearing, that provides rotatable support for the gearbox hub 27a on the pivot support arm 15a.

Figure 21:
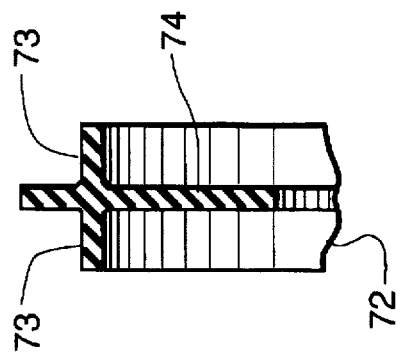
FIG. 21 is an enlarged partial cross-sectional view of the labyrinth seal taken along lines 21—21 of FIG. 19.
Figure 20:
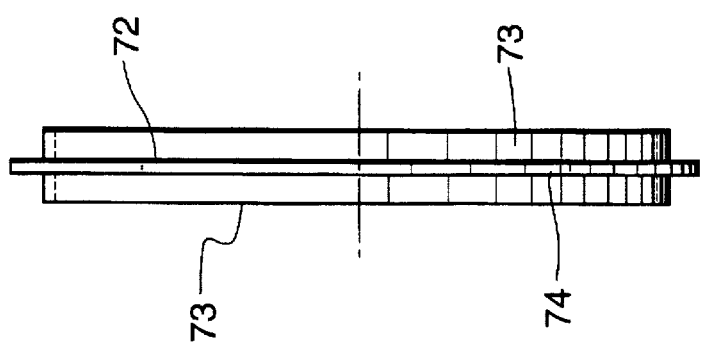
FIG. 20 is a radial elevation of the labyrinth seal shown in FIG. 19.
Figure 19:
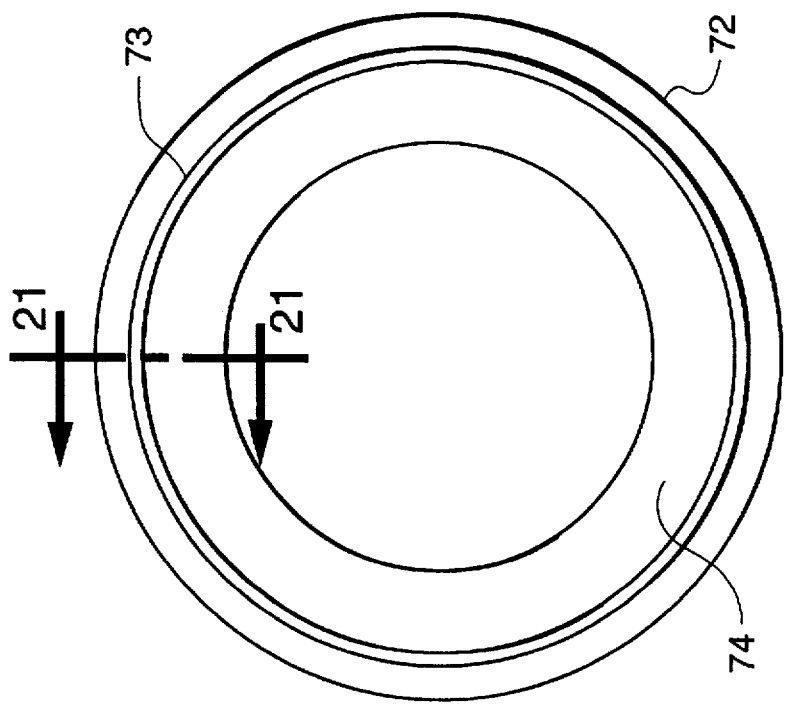
FIG. 19 is a detail plan view of the labyrinth seal corresponding to the pivot axis of the pivot mechanism.

A groove 71 is formed between the pivot support arm 15a, the gearbox housing 27 and the thrust washer 29 to provide clearance for the relative movement to be accommodated therebetween. To enhance the operation and effectiveness of the sealing apparatus 70, the groove 71 is formed in a T-shaped configuration. The sealing apparatus 70 includes a circular labyrinth seal 72 formed to correspond to the T-shaped groove 71. The labyrinth seal 72, as best seen in FIG. 21, is formed with a T-shaped cross-section with opposing, axially extending legs 73 projecting perpendicularly from the body 74 of the labyrinth seal 72 to fit within the groove 71 and retain the seal 72 radially within the groove 71, as well as form a labyrinth through which dirt must pass in order to reach the bushing 29. Preferably, the thrust washer 29 is bonded to the labyrinth seal 72.

Figure 23:
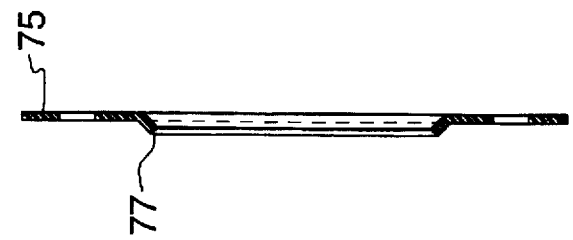
FIG. 23 is a cross-sectional view of the face seal taken along lines 23—23 of FIG. 22.
Figure 22:
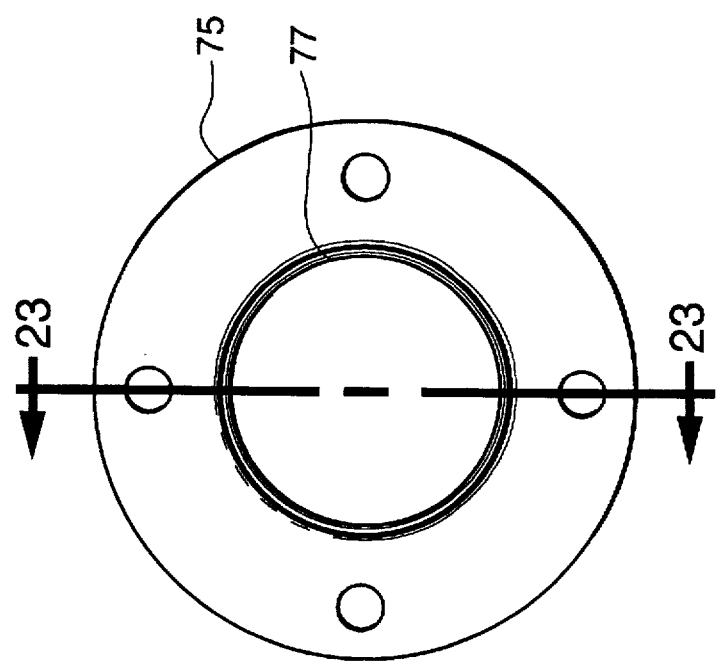
FIG. 22 is a detail plan view of the face seal corresponding to the pivot axis of the pivot mechanism.

The exterior face of the pivot mechanism 28 must also be sealed to prevent dirt from reaching the bushing 29a, the edge of which is exposed. As shown in FIGS. 22 and 23, the sealing apparatus 70 further includes a circular face seal 75 detachably fastened to the pivot support arm 15a. As best seen in FIG. 23, the face seal 75 has an inner diameter that is permanently deformed inwardly to form a lip 77 that engages the gearbox hub 27a. The deformed lip 77 creates an inner cavity 79 underneath the face seal 75. The cavity 79 can be filled with grease to provide a further deterrent to the entrance of dirt to the bushing 29a.

Appropriate grease fittings (not shown) can be provided to enable the supply of grease within the inner cavity 79 to be replenished without requiring the removal of the face seal 75. Preferably, the lip 77 will be somewhat pliable to accommodate the tolerances between the gearbox hub 27a and the pivot support arm 15a and to facilitate the sealing therebetween. One skilled in the art will recognize that the exterior face of the pivot mechanism 28 is duplicated front and back so as to provide proper pivotal support between the gearbox housing 27 and the pivot support arms 15a.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a mower supportable from a prime mover and operably connected to said prime mover to receive operative power therefrom, said mower having a frame including a pivot support arm; a cutterbar pivotally supported from said pivot support arm for movement between a raised transport position and a lowered operative position; a drive mechanism supported from said frame to receive rotational power from said prime mover and transfer the rotational power to said cutterbar for operably driving said cutterbar; a pivot mechanism interconnecting said cutterbar and said pivot support arm to provide pivotal movement of said cutterbar, said pivot mechanism including bearing means for permitting relative pivotal movement between said pivot support arm and said cutterbar; and sealing means to protect said bearing means from exposure to foreign material introduced externally of said pivot mechanism, the improvement comprising:

a radially extending groove formed between an inner portion of said pivot support arm and a corresponding portion of said cutterbar pivotally supported from said pivot support arm, said groove including portions projecting perpendicularly thereto in generally opposing directions; and a labyrinth seal having a shape to correspond to said groove and including axially extending legs to fit within said axially extending portions of said groove, said labyrinth seal forming a labyrinth path for the entrance of said foreign material to said bearing means.

2. The mower of claim 1 wherein said groove and said labyrinth seal are configured in a T-shaped cross-sectional configuration.

3. The mower of claim 2 wherein said sealing means further comprises a face seal connected to an outer portion of said pivot support arm and overlapping said corresponding portion of said cutterbar pivotally supported from said pivot support arm, said face seal including an inner diameter formed with a deformed lip projecting inwardly to engage said corresponding portion of said cutterbar pivotally supported from said pivot support arm.

4. The mower of claim 3 wherein said deformed lip creates an inner cavity underneath said face seal above said bearing means.

5. The mower of claim 4 wherein said cutterbar includes a gearbox operably connected to said drive mechanism to transfer rotational power throughout said cutterbar, said gearbox being said corresponding portion of said cutterbar pivotally supported from said pivot support arm.

6. The mower of claim 5 wherein said bearing means includes a thrust washer positioned adjacent said labyrinth seal to withstand longitudinal forces imposed on said cutterbar and a bushing positioned between said pivot support arm and said gearbox for rotational support therebetween.

7. In a mower supportable from a prime mover and operably connected to said prime mover to receive operative power therefrom, said mower having a frame including a pivot support arm; a cutterbar pivotally supported from said pivot support arm for movement between a raised transport position and a lowered operative position; a drive mechanism supported from said frame to receive rotational power from said prime mover and transfer the rotational power to said cutterbar for operably driving said cutterbar; a pivot mechanism interconnecting said cutterbar and said pivot support arm to provide pivotal movement of said cutterbar, said pivot mechanism including bearing means for permitting relative pivotal movement between said pivot support arm and said cutterbar; and sealing means to protect said bearing means from exposure to foreign material introduced externally of said pivot mechanism, the improvement comprising:

a face seal connected to an outer portion of said pivot support arm and overlapping said corresponding portion of said cutterbar pivotally supported from said pivot support arm, said face seal including an inner diameter formed with a deformed lip projecting inwardly to engage said corresponding portion of said cutterbar pivotally supported from said pivot support arm, said deformed lip creating an inner cavity underneath said face seal above said bearing means.

8. The mower of claim 7 wherein said sealing means further comprises:

a radially extending groove formed between an inner portion of said pivot support arm and a corresponding portion of said cutterbar pivotally supported from said pivot support arm, said groove including axially extending portions projecting in generally opposing directions; and a labyrinth seal having a shape to correspond to said groove and including axially extending legs to fit within said axially extending portions of said groove, said labyrinth seal forming a labyrinth path for the entrance of said foreign material to said bearing means.

9. The mower of claim 8 wherein said groove and said labyrinth seal are configured in a T-shaped cross-sectional configuration.

10. The mower of claim 9 wherein said cutterbar includes a gearbox operably connected to said drive mechanism to transfer rotational power throughout said cutterbar, said gearbox being said corresponding portion of said cutterbar pivotally supported from said pivot support arm.

11. The mower of claim 10 wherein said bearing means includes a thrust washer positioned adjacent said labyrinth seal to withstand longitudinal forces imposed on said cutterbar and a bushing positioned between said pivot support arm and said gearbox for rotational support therebetween.

12. In a mower supportable from a prime mover and operably connected to said prime mover to receive operative power therefrom, said mower having a frame including a pivot support arm; a cutterbar pivotally supported from said pivot support arm for movement between a raised transport position and a lowered operative position; a drive mechanism supported from said frame to receive rotational power from said prime mover and transfer the rotational power to a gearbox mounted on said cutterbar for operably driving said cutterbar; a pivot mechanism interconnecting said cutterbar and said pivot support arm to provide pivotal movement of said cutterbar, said pivot mechanism including bearing means for permitting relative pivotal movement between said pivot support arm and said cutterbar; and sealing means to protect said bearing means from exposure to foreign material introduced externally of said pivot mechanism, the improvement comprising:

a radially extending groove formed between an inner portion of said pivot support arm and said gearbox, said groove including axially extending portions projecting in generally opposing directions;

a labyrinth seal having a a T-shaped cross-sectional configuration to correspond to said groove and including axially extending legs to fit within said axially extending portions of said groove, said labyrinth seal forming a labyrinth path for the entrance of said foreign material to said bearing means; and a face seal connected to an outer portion of said pivot support arm and overlapping said gearbox, said face seal including an inner diameter formed with a deformed lip projecting inwardly to engage said gearbox and creating an inner cavity underneath said face seal above said bearing means.

13. The mower of claim 12 wherein said bearing means includes a thrust washer positioned adjacent said labyrinth seal to withstand longitudinal forces imposed on said cutterbar and a bushing positioned between said pivot support arm and said gearbox for rotational support therebetween.

* * * * *